United States Patent [19]

Carlson

[11] Patent Number: 5,057,833
[45] Date of Patent: Oct. 15, 1991

[54] PASSIVE OPTICAL AIR TRAFFIC ALERT SYSTEM

[75] Inventor: Randolph S. Carlson, Carson City, Nev.

[73] Assignee: OTL, Inc., Carson City, N.Y.

[21] Appl. No.: 432,624

[22] Filed: Nov. 7, 1989

[51] Int. Cl.$^5$ .............................................. G08G 5/00
[52] U.S. Cl. ...................................... 340/961; 342/29; 362/62; 364/461
[58] Field of Search ................. 340/961, 981; 362/62; 342/29, 52-54, 455; 250/214 B; 364/439, 461

[56] References Cited

U.S. PATENT DOCUMENTS

| | | | |
|---|---|---|---|
| 3,551,676 | 12/1970 | Runnels | 340/961 |
| 3,563,651 | 2/1971 | Alvarez et al. | 342/455 |
| 3,572,928 | 3/1971 | Decker, Jr. et al. | 342/455 |
| 3,620,626 | 11/1971 | Daly et al. | 340/961 |
| 3,731,082 | 5/1973 | Blaylock | 340/981 |
| 4,277,170 | 7/1981 | Miles | 340/961 |
| 4,477,814 | 10/1984 | Brumbaugh et al. | 342/53 |
| 4,527,158 | 7/1985 | Runnels | 340/981 |
| 4,724,312 | 2/1988 | Shaper | 250/214 B |

Primary Examiner—Joseph A. Orsino
Assistant Examiner—Brent A. Swarthout
Attorney, Agent, or Firm—Thorpe, North & Western

[57] ABSTRACT

A device and method for detecting the presence of nearby aircraft which have a strobe-type, anticollision signalling device with respect to a monitoring aircraft. Incoming radiation is detected, including (i) background radiation (ii) pulse-like radiation occurring in random manner, and (iii) pulse-like radiation characterized by uniform periodic pulse rate. Background radiation is filtered, leaving a signal representing pulse-like radiation occurring either in random manner and/or periodic regularity. Those signals having periodic regularity are identified and recorded as pulse trains which provide the basis for generating an alarm indicating detection of a strobe anticollision device. Additional devices and procedures are applied with respect to the invention to define its accuracy and economy as part of a passive optical traffic alert system for small aircraft.

3 Claims, 3 Drawing Sheets (REVISED)

(REVISED)

PASSIVE OPTICAL AIR TRAFFIC ALERT SYSTEM

BACKGROUND OF THE INVENTION

1. Field of Invention

This invention relates to methods and devices for providing a flight crew of an equipped aircraft with timely traffic advice regarding nearby aircraft equipped with operating strobe-type anticollision lights. More specifically, the present invention pertains to methods and devices for detecting anticollision, strobe-like emissions despite background noise and other light pulses which would tend to activate a traffic alert alarm despite the absence of nearby aircraft.

2. Prior Art

Numerous devices and methods have been employed over aviation history to assist in the visual detection of nearby aircraft. The use of anticollision strobe lights mounted on the exterior fuselage and wing tips has long been part of standard aircraft equipment for enhancing the ability of flight personnel to see approaching aircraft.

It is obviously desirable to facilitate early detection of such anticollision strobe lights so that a pilot may take evasive action well in advance of danger. In daylight hours, however, visual identification of a momentary pulse of light generated at substantial distance is very difficult. Accordingly, scanning devices have been developed to assist in identifying the occurrence of strobe flashes, as well as the approximate azimuth of the strobe light with respect to the aircraft. U. S. Pat. Nos. 3,551,676 and 4,527,158 by Runnels describe the general use of optics and detectors which endeavor not only to identify the strobe pulse of a nearby aircraft, but at the same time provide filtering or blocking of background noise and stray pulses which may generate an alarm signal when in fact aircraft are not in the vicinity. The latter Runnels patent suggests the use of multiple detectors of photosensitive composition as part of a scanning system. Strobe pulse signals are isolated from background noise by use of a bandpass filter which is tuned to the range of frequencies associated with strobe light devices. In addition, a threshold adjustment enables blocking of much of the background noise gathered by the respective detectors.

U. S. Pat. No. 4,724,312 by Snapper also discloses a detection system embodying forms of filters for eliminating spurious and background signals. In addition, Snapper and Runnels provide a blocking circuit for disabling the detector system during the emittance of pulse radiation from strobes mounted on the monitoring aircraft. These disclosed devices also provide some orientation indication as to the azimuth of the pulse detected. This directional orientation is basically achieved by determining which of a plurality of detectors received the strobe radiation. The azimuth orientation is based on the relative position of that detector on the exterior of the aircraft.

Although the use of passive detectors enhances the ability of a flight crew to detect approaching aircraft having anticollision strobe lights, lack of system efficiency and limited effective range have inhibited commercial acceptance in the small aircraft industry. Such systems may be contrasted with active systems wherein a radar signal or some other form of radiation is emitted by the monitoring aircraft, with subsequent detection of a reflected signal as the basis of detection. In such instances, the detectors are tuned specifically to the frequency of radiation which was emitted, making identification of the reflected signal much less complex.

In a passive system such as the present invention, detectors are not tuned to a specific frequency because strobe light frequencies vary, not only in wave length and amplitude, but in pulse rate. Therefore, the system must be prepared to detect a variety of signals which generally conform to a strobe-like flash falling within the frequency range of approximately 300 nm to 1,000 nm with pulse durations of 150 microseconds to 600 microseconds. Pulse repetition rates further vary between 40 and 120 pulses per minute. Accordingly, the challenge of developing an effective passive system for detecting strobe lights is developing hardware and electrical and logic circuitry which can differentiate among these numerous variables for incoming pulse signals.

A frequent problem with passive strobe detectors has been to develop techniques which isolate true strobe pulses from other signals which have the appearance of a pulse of light similar to that which might be generated by a strobe source. If one designs the range of detection too narrow, true strobe pulses which fall outside the narrow definition may not be identified. For example, hazy or cloudy conditions may affect the detected signal such that it falls outside the narrow range defined as a desired strobe signal. On the other hand, if one broadens the parameters of the system to cover the full range of potential strobe emissions under all weather conditions, the detector system will not only identify such actual strobe pulses, but will trigger false alarms based on reflections of light from ground vehicles and structures, aircraft reflections and changing background such as white clouds against blue sky.

Past efforts to resolve this dichotomy have generally focused on enhancing the accuracy of detection of a true strobe pulse, to thereby enable distinguishing this pulse from background noise or other similar forms of radiation. Similarly, prior art techniques for enhancing such passive detection systems have concentrated on more accurate definition of the spurious signals which could trigger an alarm condition. The system is than provided with blocking circuits or filters to delete or ignore those specific signals. For example, the Runnels and Snapper approach of disabling the detector during emission of the strobe of the monitoring aircraft is representative of the philosophy of more accurately defining the unwanted signal which may be detected, with subsequent screening of those signals to avoid an erroneous alarm.

It has now become apparent to the present inventors that the traditional design strategy of attempting to more accurately specify parameters of (i) the strobe pulse to be detected or (ii) the spurious signal to be screened, filtered or blocked is simply not compatible with the "real" world. Too many variables exist in pulse amplitude, width and pulse rate to enable careful refinement of a sufficiently narrow bandpass capable of retrieving only true pulse signals. With respect to spurious signal definition, there are simply too many predictable and unpredictable forms of light pulse to enable development of a catalog of spurious signal forms which the detection system must ignore. Furthermore, some spurious signals may actually have the form and appearance of a true strobe pulse. A system which deletes such a signal form from detection may in fact delete a true pulse in error.

3

What is needed, therefore, is a passive detection system which is capable of identifying substantially all pulse-type signals similar to an anticollision strobe signal and isolating only those signals which are true strobe pulse signals. Just as important, this system needs to be capable of operating with respect to signals detected at a range of as much as 3 nautical miles, as compared to the more limited ranges of approximately 1 mile for prior art systems.

OBJECTS AND SUMMARY OF THE INVENTION

It is an object of the present invention to provide a method and system for detecting strobe signals of an anticollision signaling device wherein the method does not rely on actual individual pulse parameters to identify a pulse as originating from a strobe signaling source.

It is an additional object of this invention to provide enhanced range detection for strobe pulses extending to three nautical miles and beyond.

It is a further object of this invention to provide a method and device for detecting anticollision strobe signals from nearby aircraft despite great variations in background noise and occurrence of spurious signals and pulses which would otherwise give the appearance of a strobe pulse.

Yet another object of the present invention is to provide a device and method for detecting strobe pulses which includes visual display of the orientation of the strobe source with respect to the monitoring aircraft.

Yet another object of this invention is to provide audio signal corresponding in time sequence with each strobe pulse of the detected strobe source to facilitate early visual detection of the nearby aircraft.

These and other objects are realized in a device and method for detection of an anticollision signaling device embodying the following steps. First, radiation from the strobe-like signaling device is detected in a sensing means which receives the strobe-like radiation in combination with (i) background radiation and (ii) pulse-like radiation occurring in random manner having a comparable amplitude and pulse with radiation of the signaling device. The next step involves repeatedly generating an electromagnetic signal representing the cumulative radiation of each sensing event of the previous step. Means are provided for filtering out that portion of the signal corresponding to background radiation, thereby generating a signal which substantially represents only (i) pulse-like radiation occurring in random manner and (ii) that pulsed radiation emitted from the strobe device. In the next step, means are provided for detecting that portion of signal generated in the previous step which represents pulsed radiation occurring in periodic manner within a frequency associated with the anticollision warning device. Successive pulse signals of such periodic nature have an assigned unique time factor which identifies each signal by its relative time of sensing in accordance with the first step of this process. The next procedure involves identifying sequentially paired signals among the pulse signals of the previous step whose respective separating time intervals are the same and which fall within a general range of time intervals assigned to strobe-like anticollision devices. Finally, subsequent sequential signals being identified on an ongoing basis by application of the previous steps are compared and matched in time interval to identified paired signals of the previous step which have the same time interval, thereby creating a sequential train of pulse signals representing a single periodic signaling device. Upon occurrence of such a periodic train, an alarm is generated giving notice to flight personnel that a strobe-like device has been detected. The device and method further includes means for assigning azimuth orientation and displaying the detected aircraft on an appropriate screen. Audible warning signals are synchronized with the arriving pulse to assist flight personnel in making visual contact with the blinking strobe.

Other objects and features of the present invention will be apparent to those skilled in the art in view of the following detailed description, taken in combination with the accompanying drawings.

DETAILED DESCRIPTION OF THE INVENTION

Figure 1:
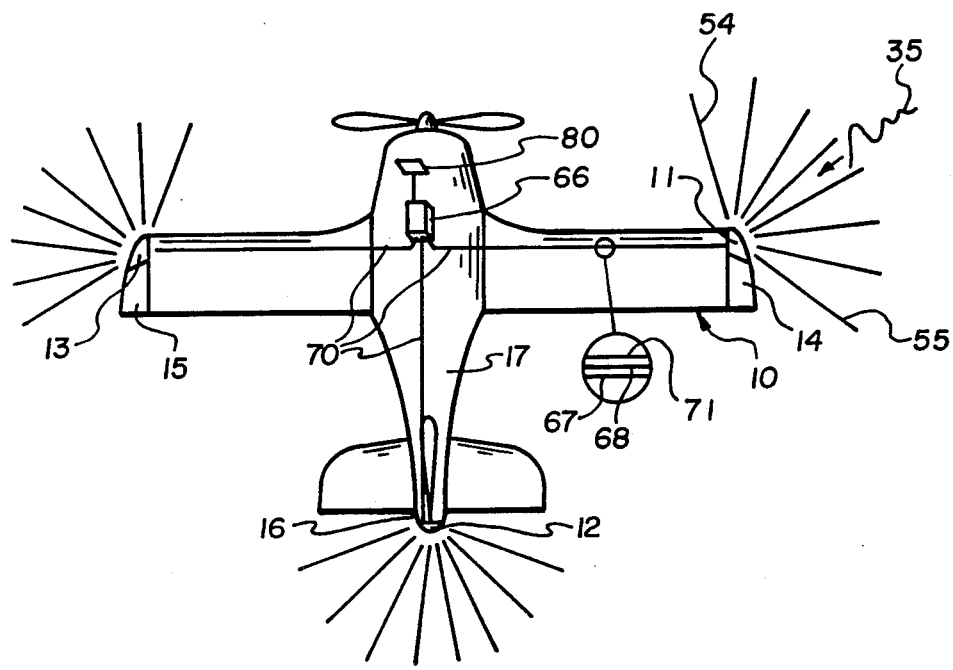
FIG. 1 illustrates a graphic view of an aircraft embodying the subject detection system with detection assemblies mounted at opposing wing tips and at the tail of the fuselage.

Referring now to the drawings:

FIG. 1 shows a typical aircraft 10 which includes detector pods 11, 12 and 13 mounted at extremities of the aircraft. The illustrated positions include respective wing tips 14 and 15 and the tail section 16 of the fuselage. These locations are favorable because they facilitate orientation of detection devices which are directed away from the body of the aircraft. Otherwise, light reflections should be received at one or more of the detectors whose field of view might include that portion of fuselage or aircraft body receiving a reflection of the sun or of other light sources such as a strobe light of the monitoring aircraft 10.

Figure 2:
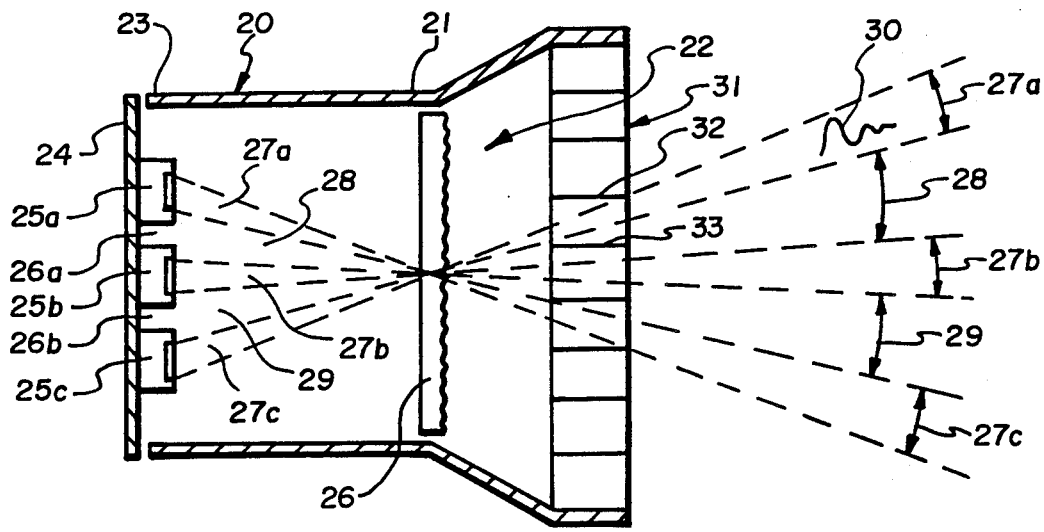
FIG. 2 is a graphic representation of an optical detection assembly utilized to detect incoming radiation.
Figure 4:
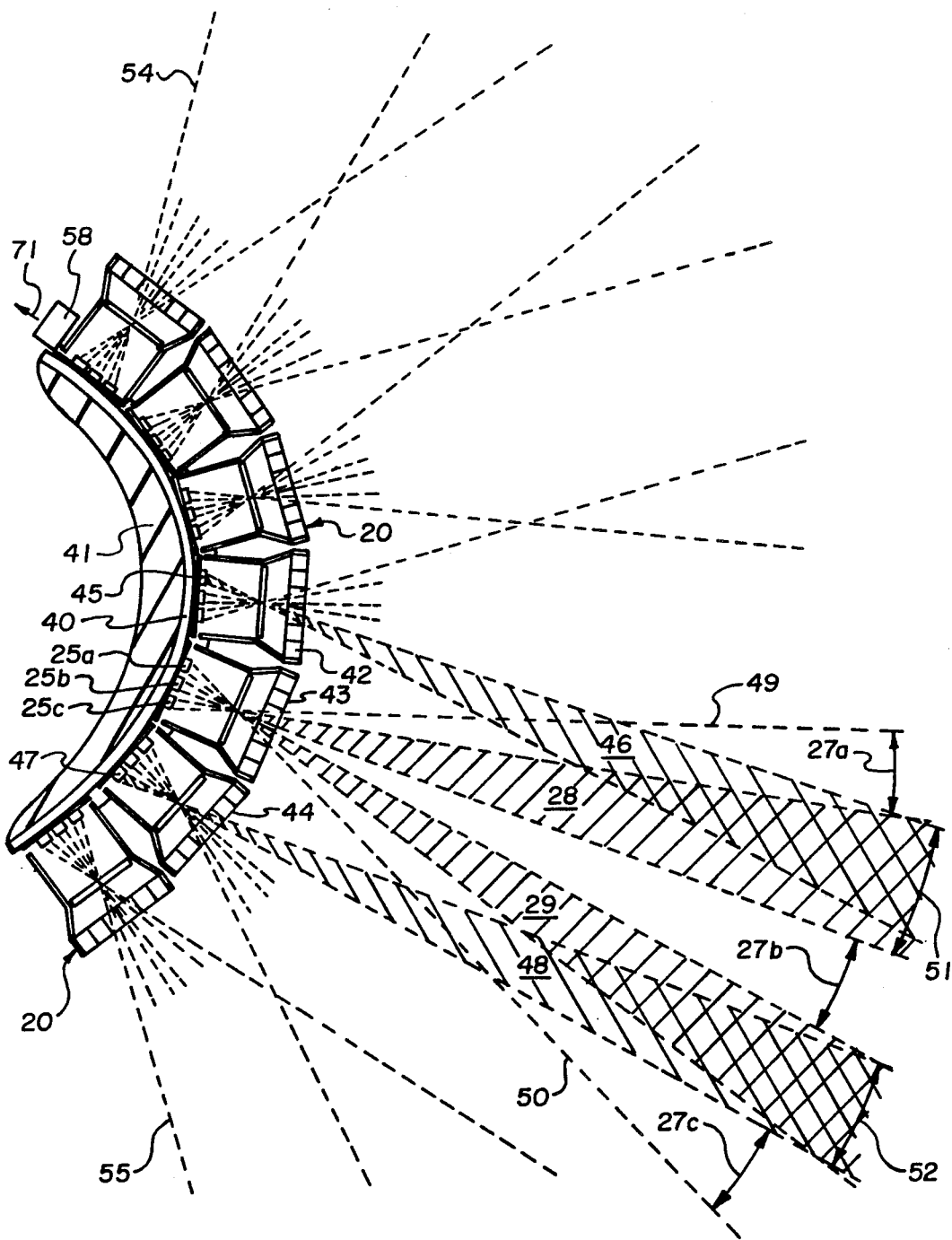
FIG. 4 graphically illustrates an array of detector assemblies such as might be positioned at a wing tip, illustrating overlap of respective fields of view for providing full circumferential scan of the plane of flight.

Each pod 11, 12 and 13 includes an array of detectors as individually represented in FIG. 2, and collectively illustrated in FIG. 4. The individual detector assembly 20 comprises a tubular enclosure or wall 21 which effectively blocks radiation from all other orientations except a forward aperture 22. The tubular enclosure 21 is mounted at a proximal end 23 to a base member 24.

This base member actually comprises a circuit board which provides a physical mounting location for an array of three photoelectric detectors 25a, b and c whose outputs are coupled directly into preamplifier circuitry formed as part of the circuit board 24. This aspect of the invention is discussed hereafter in connection with FIG. 3 wherein the optical assembly circuit board 24 is shown in broken lines.

A Fresnel lens 26 is positioned within the tubular enclosure 21 for gathering light and directing it from the aperture 22 to photosensitive faces of the respective detector elements 25 a, b and c. The Fresnel lens is utilized to reduce the dimensional size of the detector 20, thereby reducing required space onboard the aircraft.

Each of the detector elements 25 a, b and c is mounted at the base member 24 in an individually separated array, leaving gaps 26a and 26b. This separated configuration generates a series of separated fields of view 27a, 27b, and 27c which are respectively separated by non-monitored sectors 28 and 29. The relationship of monitored fields of view 27 a, b and c, and non-monitored sectors 28 and 29 is discussed hereafter.

Light, including strobe pulse signals 30 passes through a honeycomb screen 31, between honeycomb wall sections 32 and 33 and the long field of view 27a. This radiation 30 is positioned on the detector element 25c by action of the Fresnel lens 26.

One advantage of utilization of a lens device 26 with respect to the disclosed invention is that use of a lens common to one or more of the detector elements 25 enables a relative ratio increase in the effective optical aperture of the detector. This thereby increases the shot noise associated with background radiation received concurrently with pulse signal 30. This increase is approximately proportional to the square root of the relative ratio increase in the effective optical aperture. At the same time, pulse-like radiation signal strength is increased in a linear manner in proportion with the relative ratio increase of effective optical aperture. This provides the advantage of increasing the pulse-like signal strength relative to the shot noise by the square root of the stated ratio increase. This feature of the invention will be more clearly understood by those skilled in the art in connection with a discussion of associated circuitry and logic control applied with respect to background signal in combination with pulse signals 30.

FIG. 4 shows an array of the detectors of FIG. 2 positioned in one of the mounting pods 11, 12 and 13. This array is configured as a single structural element mounted to a support base 40 which rigidly positions each detector 20 in proper orientation with respect to a defined field of view.

The base includes shock absorbing means such as a rubber mount 41 to reduce the impact of vibrational energy transferred from the aircraft into the detector assembly. Minimization of vibrational activity of the detectors is not only significant from a mechanical point of view, but also is important in reducing signals which may simulate the appearance of periodic pulses. Specifically, if a detector vibrates in a periodic manner such that reflected sunlight is modulated in and out of detector view, the steady light may take on a periodic image as a pulse train. Accordingly, it has been discovered that reducing and controlling vibrational energy within the detector array can reduce occurrence of fallacious signals which might trigger a false alarm. This is to be discussed in greater detail in a separate patent application of the inventors.

To assure maximum safety and effectiveness of this detection system, it is essential that air space be scanned in an annular envelope fully surrounding the aircraft along the plane of flight. Diverging angles of view extend detection capability for aircraft both above and below the plane of flight.

The present invention adopts a unique configuration of separated detectors 25a, b and c as has been previously described. Although this results in a series of nonmonitored sectors 28 and 29, such gaps are resolved by overlapping fields of view in the manner illustrated in FIG. 4. Specifically, referring to the detectors identified as 42, 43 and 44 specific fields of view and nonmonitored sectors have been identified. With respect to detector 42, a field of view 46 is shown emanating from detector element 45. With respect to detector 43, common reference numerals have been carried forward from FIG. 2. Accordingly, these detectors are identified as 25a, 25b and 25c with corresponding fields of view of 27a, 27b and 27c. Finally, detector 44 includes an identified detector element 47 which generates a field of view 48.

Turning then to the issue of full coverage of the sector of air space bounded by azimuth indicators 49 and 50, FIG. 4 illustrates the concept of interdigitating the respective fingers or fields of view from each detector element to overlap with nonmonitored sectors. Specifically, it will be noted that nonmonitored sectors 28 and 29 of detector 43 are respectively monitored by detector element 45 whose field of view 46 traverses airspace as indicated at arrow 51. Similarly, detector element 47 provides coverage by its field of view 48 as indicated at arrow 52. Accordingly, a full scan of the sector of space between azimuth lines 49 and 51 is accomplished by the three detector elements of detector 43 and single detector elements of the adjacent detectors 42 and 44.

The specific optical arrangement provided by the detector assembly illustrated in FIG. 2 is as follows. Each respective view of view 27a, 27b and 27c are approximately six degrees of azimuth, spread over a full angular distance of 30 degrees. This leaves 12 degrees represented by the respective six degree nonmonitored sections 28 and 29 as uncovered by the single detector. As has been discussed previously in connection with FIG. 4, these two sectors are scanned by detector elements from adjacent detectors 45 and 47 with corresponding fields of view 46 and 48. Therefore, the three contiguous detectors 45 and 47 cooperate to cover the full 30 degree range in azimuth as shown between reference numerals 49 and 50. The division of this sector range from azimuth indicator 49 to 50 into five equal sectors of approximately six degrees of azimuth provides the desired full coverage. This principle is applied with respect to the array of seven detectors shown in FIG. 4 to provide a full scan between azimuth indicators 54 and 55, which correspond to azimuth marks on the right wing of FIG. 1. It will be apparent to those skilled in the art that providing the same coverage with respect to fields of view of detector pods 12 and 13 establishes a full circumferential scan of the aircraft. As indicated previously, such scanning will detect a variety of radiation signals, most of which will constitute background noise. In addition to background radiation, the detectors will sense pulse-like radiation occurring in random manner such as reflections of sunlight from car windshields, bodies of water and from other sources which simulate a pulse of light comparable in amplitude and pulse with radiation of strobe-like devices operating on typical aircraft. In addition to this radiation, the detector system may sense pulse radiation 35 as illustrated in FIG. 1 which will be referred to herein as a "true" pulse, meaning that the pulse of light was generated by an anticollision strobe device mounted on a nearby aircraft.

Instead of attempting to define the specific parameters of this "true" pulse of light 35, or to refine definition of parameters for false signals, the present invention detects all such radiation and processes it collectively in a manner such that the true pulse 35 is ultimately distinguished from all other sources of radiation. This resolution is accomplished without the need of determining individual pulse characteristics, thereby greatly simplifying equipment requirements and associated expense. Surprisingly it provides improved accuracy and enhanced response time.

Figure 3:
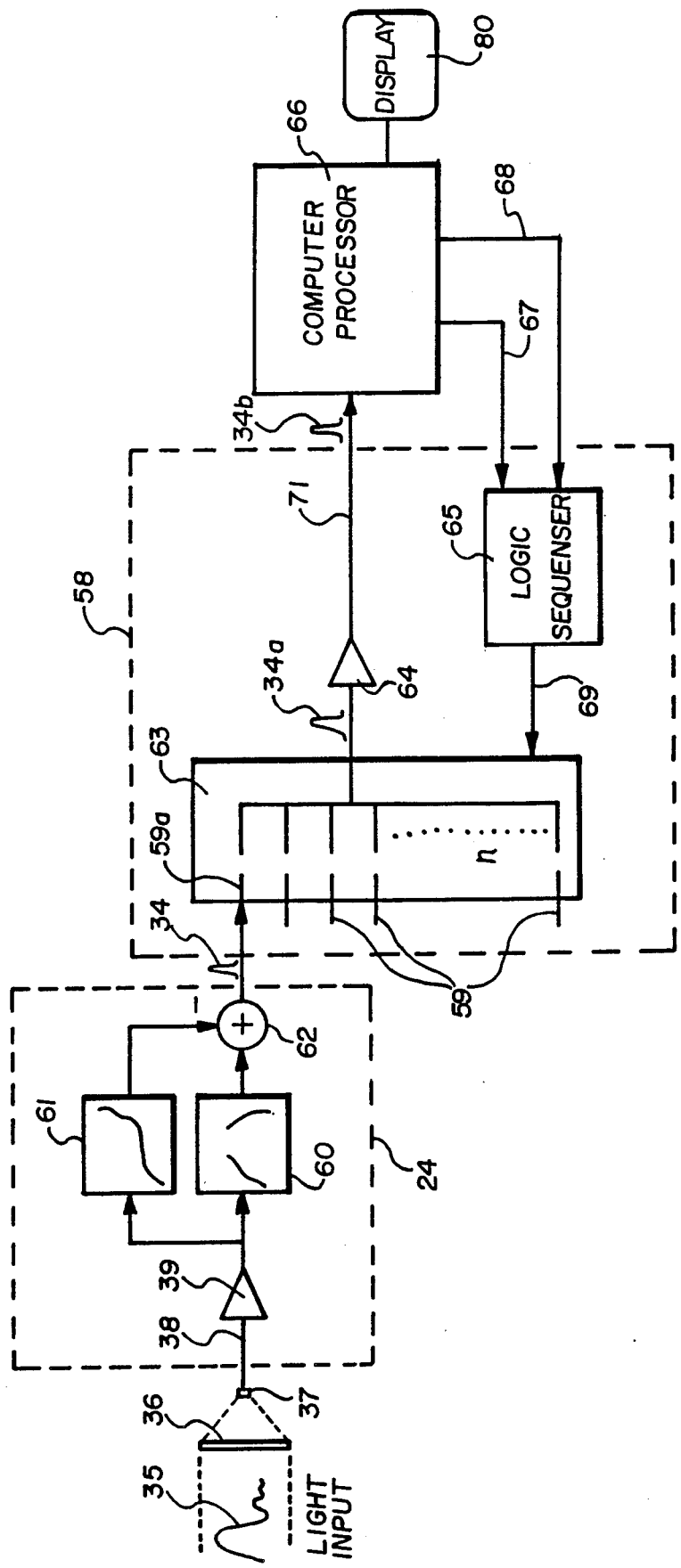
FIG. 3 illustrates basic support circuitry for receiving and processing electromagnetic signals generated by the detector of FIG. 2.

Referring now to FIG. 3, as radiant energy 35 is collected by the lens device 36 and is directed on detector 37, a voltage signal is generated in accordance with well known quantum mechanics principles. The resultant signal is transmitted over line 38 to a preamplifier 39 positioned on the optical assembly board 24. This signal is amplified and converted to a voltage signal, which is split and transmitted to a bandpass filter 60 and background compensation circuit 61. These circuits operate to effectively remove the steady state background signal and to distinguish pulses of the characteristic duration of strobe pulses.

The passband filter operates at 200 hertz to 3K hertz and includes conventional amplification. The background compensation circuit is a nonlinear circuit which produces a bias signal proportional to the square root of the background level for low levels of background, increasing sharply for very high levels of background. This bias signal is then combined at a summing board 62 with the output of the bandpass filter so as to bias counter to pulse amplitude of the bandpass filter. This effectively makes the system less sensitive to background light level increases and eliminates the false signals that would otherwise result from the random fluctuations (quantum mechanical or shot noise) of the background. Specifically, the background compensation circuit functions to generate a threshold compensation signal proportional to the square root of the average background radiation seen at the detector. This signal is applied to adjust the background filter so as to select only pulse-like radiation of larger amplitude as the intensity of the background radiation increases.

The background noise, as noted above, varies as the square root of the background intensity. By causing the bias signal to increase rapidly at high background levels, the system is effectively blanked for cases where sunlight is directly encountered in any field of view. This feature is important because the image of the sun on the detector may be effectively modulated by very slight nonuniformities of response across the detector, such as when the detector assembly vibrates with normal aerodynamic and mechanical motions of the aircraft. Without blanking these very high intensity signals, undesirable, false alarms may result.

Accordingly, the signal 34 emanating from the optical assembly board 24 and associated filter circuitry corresponds to a signal which substantially represents only (i) the pulse-like radiation occurring in random manner and (ii) the pulsed radiation emitted from an anticollision strobe device. It should be noted that each detector element 25 is processed by its preamplifier and filter circuit comprised of components 39, 60, 61 and 62. Accordingly, each detector 20 generates three signals 34, corresponding to the three independent detectors contained therein. The array of seven detectors in FIG. 4 would produce 21 separate signals 34, representing 21 respective fields of view as illustrated. Inasmuch as the detector position and orientation are known, each signal 34 can be uniquely characterized as belonging to a particular field of view and associated detector.

These signals 34 are transmitted through an analog signal multiplexer 63 to a level comparator 64. This multiplexer 63 is mounted on a circuit board 58 in combination with a comparator 64 and logic sequencer 65. The multiplexer 63 includes sufficient inputs 59 corresponding to the number of detectors 37 being monitored. For illustration purposes only one detector and associated optical assembly 24 is illustrated, with its input signal 34 being transmitted to a multiplexer input pin 59a. In actuality, the multiplexer board 58 would have 21 input leads, each carrying pulse signals 34 into 21 respective input pins 59 of the multiplexer 63. As is suggested in FIG. 3, any number of n imputs may be associated with the multiplexer board 63.

The multiplexer is controlled by logic sequencer or counter 65 which is synchronized by timing logic in a computerized display and target processor 66. Processor 66 keeps track of the detector element source 37 and time of arrival for each signal 34 received at the multiplexer 63. Each detector pod 11, 12 and 13 with its 21 detectors 37 has its own multiplexer board 58 as is illustrated in FIG. 4. The multiplexer 63 collects all of the various pulse signals 34 from the detector elements 37 and transmits each pulse signal 34a to the comparator 64. The output signal 34b of the comparator 64 is transmitted over line 71 to the processor 66.

In the illustrated embodiment of FIG. 1, three multiplexer boards are provided at each of the respective pods 1, 12 and 13. Connecting lines 70 are actually a combination of three lines as illustrated in the enlargement, including line 71 which carries the pulse signal 34b, as well as lines 67 and 68 which are described hereafter. Therefore, processor 66 receives signals such as 34b from three multiplexer boards 58, each receiving input from 21 detectors 37. These various pulse signals 34b are identified by the processor with respect to the originating detector element 37, as well as the specific time of arrival of the pulse 35.

Specifically, by noting the timing of digital pulses 34b coming from the various comparators 64 providing output from each of the detector pods 11, 12 and 13, the timing logic within the processor 66 can determine the channel or specific detector element receiving the signal, and hence the bearing associated with each detected pulse. The sequencer 65 receives a clock pulse through line 67 which is developed by the processor 66. Similarly, the processor 66 generates a sync pulse, which operates to reset the counter 65 in a manner which will be described hereafter. This sync signal is transmitted over line 68 to the logic sequencer 65. Control signals from the logic sequencer 65 are directed to the multiplexer 63 over line 69. The processor 66 generates target and display signals on a display device 80 accessible to flight crew personnel.

It will be apparent to those skilled in the art that the present configuration is a significant improvement in terms of economic use of limited space on the aircraft. Not only are the detector pods of minimal size, but connecting wires are reduced to a minimum requirement including a line 71 carrying the comparator output, from each of the detector pods 11, 12 and 13 and return control lines 67 and 68 which respectfully provide clock pulse and sync pulse signals to synchronize all pods with respect to time and to identify all generated signals in connection with an azimuth corresponding to the specific field of view of the source detector elements 25.

It should be recognized that the pulse signal 34b transmitted from the respective comparator 64 has not yet been distinguished as a "true" pulse. In fact, it may be a reflection of sunlight, an abrupt shift in background radiation, or any number of other random light pulses. As previously indicated, the present invention does not rely on characterization of individual pulses, but processes each pulse as if it were a true strobe pulse representing a potential target or nearby aircraft.

Actual identification of true strobe pulses is accomplished by logic within the processor 66. This processor and its associated input devices provide means for rejecting that portion of signal 34b generated from the comparators 64 which represents pulsed radiation occurring in random manner. Rather than attempting, however, to identify such pulses of random nature, the present invention recognizes the periodicity or regularly spaced pulse nature of strobe pulse signals. The processor 66 repeatedly evaluates incoming signals representing the pulsed radiation output of the comparator 64 and determines the occurrence of strobe-like-periodicity for successive signals. Where a train of sequential signals are separated by equal time intervals, the processor identifies the occurrence of periodicity and records the event as a probable strobe pulse. This occurrence is recorded in memory and associated with the specific azimuth orientation of the detector element which triggered the positive signal at comparator 64. The processor also records the time interval between the periodic pulses and scans future pulses to identify similar time intervals which may relate to the same strobe source.

Detection of such ongoing pulse signals having common time intervals and a common azimuth develops, a train of pulses which are displayed on the display screen 80 for the benefit of the flight crew. This gives the crew a direction for visual inspection, to facilitate early detection.

Because the multiplexers for each of the respective pods 11, 12 and 13 have a capacity to scan all the optical channels represented by the detector elements 25 at a very high rate of approximately 16,000 scan per second, an effective continuous observation in all azimuth directions is provided. In addition, extreme fine resolution of arrival time of each optical pulse is noted. The processor 66 combines the azimuth or channel direction and the arrival time of information into a digital data record for each pulse received at a detector element. Having such information in digital form enables the computer to apply a variety of algorithms to discriminate between regularly spaced pulse trains such as those generated by strobe, and irregular noise pulses which are of no interest.

An example of a preferred process for discriminating between periodic pulse trains and those pulses associated with random noise is provided as follows. As pulse signals arrive at the comparator 64, the specific time of detection is assigned as a unique time factor for each signal. This establishes its relative time of sensing with respect to all other signals received and processed at the processor 66. This processor maintains an ongoing list of such time factors for all signals received over a select period of time. For example, the processor may generate 1,000 scans and list all pulse signals received during the total time interval covering the 1,000 scan process.

The processor then identifies sequentially paired signals whose respective separating time intervals are the same and which fall within a general range of time intervals assigned to strobe-like anticollision devices. For example, it is well known that approximately 40 to 120 signals per minute represent the span of acceptable pulse rates. The processor then compares and matches time intervals between subsequent, sequential signals of common orientation which have the same time interval as the identified paired signals and records this as a sequential train of pulse signals. This train represents a potential strobe source having a unique periodicity which is detected by the occurrence of regular spaced time intervals between incoming pulse signals.

To insure that a subsequent pulse signal is correctly matched to an appropriate train of periodic pulses, the processor 66 assigns an azimuth or orientation to each pulse train. If the incoming pulse is not associated with either the same azimuth or a contiguous azimuth represented by an adjacent field of view, the pulse is rejected. If, however, the incoming pulse is associated with the same azimuth, it is identified as part of the pulse train and a renewed alarm is given to the flight crew. The processor also examines adjacent or contiguous channels or fields of view to determine if the strobe source or aircraft has changed azimuth in traverse of the monitoring aircraft. Any recurring pulses which fall within contiguous fields of view are recorded and assigned to the pulse train, giving an azimuth direction to the nearby aircraft. This directional movement is also provided to the flight crew to assist in visual detection of the nearby aircraft.

After the predetermined 1,000 scans through all detectors, the processor generates a sync pulse over line 68 which concurrently rolls over all counters within the system, synchronizing not only the clock pulses, but also the aging process of each prior detection. In the present system, aging of incoming pulses is determined by assigning a bit identification in a count-down sequence. In other words, the first incoming pulse after roll over of all counters will be assigned the highest bit number or identification. Each successive pulse identified receives a lower bit number corresponding in time to the time interval identified by the system. All pulses occurring within the duration of 1,000 scans are assigned declining time factors based on this count-down process. At the conclusion of the scanning period, the processor 66 again rolls over all counters and repeats the count-down process for a new series of incoming pulses.

All prior recorded scans are accordingly aged by the number of scanned repetitions occurring since initial data entry. Therefore, each pulse is aged over time and is associated with a specific list of incoming pulses which corresponds to a specific scanning interval. The processor 66 maintains an ongoing list of unmatched pulses from each scan. A new list of pulse pairs are formed between these unmatched pulse entries and each new pulse having a common orientation (same or contiguous azimuth), with each pulse pair having a time interval corresponding to the time lapse between the identified time between the unmatched pulse and the new pulse.

With each subsequent signal and timed interval which does not fall within an ongoing train of pulse signals of common orientation with the current pulse pairs identified in the previous step, a comparison is made to determine if the new signal forms or belongs to an identified train of pulses of record. Those which do not belong to such a train are maintained on a list of unmatched pulses for future review to identify possible new pulse pairs. Those matching pulses which form part of ongoing trains of pulses are again forwarded to the flight crew display to give updating orientation and pulse rate.

The system operates on a first in-first out basis wherein signals older than up to five seconds and preferably two seconds are deleted from comparison with existing pulse pairs. The reason for such deletion arises from the fact that pulse rates for strobe lighting devices occur at a minimum of 40 pulses per minute. Therefore, it is unlikely that any signal which is not matched within an existing pulse pair within two seconds, is a random pulse, or may be the initial pulse of a new train of strobe signals to be detected. Accordingly, these unmatched signals are maintained in the list of unmatched pulses pending identification of successive pulses having common time interval.

A major advantage of the present invention is the extreme improbability of inadvertent detection of a pulse train based on the periodicity requirement. Specifically, the odds of three random pulses arriving with equal separating time intervals is extremely small. If an alarm is activated only upon the arrival of a fourth pulse within a pulse train, the odds of erroneous alarm become extremely remote. Accordingly, the present invention can be further refined by imposing a requirement that four equally spaced pulses must be detected to activate the display alarm to flag the crew. Because the present invention enables detection at ranges as far as three nautical miles, sufficient time is provided for repetitive scanning for such identification of four pulse-member trains or even more.

It will be apparent to those skilled in the art that many variations can be applied with respect to the inventive principles set forth in this disclosure. It is to be understood, therefore, that the scope of this invention is not to be limited by specific examples depicted in the figures or described in the specification, except as set forth in the following claims.

I claim:

1. A method for detecting the presence of nearby aircraft which have a strobe-like anti-collision signaling device with respect to a monitoring aircraft, said method comprising the steps of:
   (1.1) repeatedly sensing with a detector radiation form the strobe-like signalling device in combination with (i) background radiation and (ii) pulse-like radiation occurring in random manner and being comparable in amplitude and pulse width with radiation of the signalling device;
   (1.2) repeatedly generating an electromagnetic signal representing the cumulative radiation of each sensing event of step 1.1;
   (1.3) filtering out that portion of the signal corresponding to background radiation, thereby generating a pulse signal which substantially represents only (i) the pulse-like radiation occurring in random manner and (ii) the pulsed radiation emitted from the strobe device; (1.4) identifying successive pulse signals from step 21.3 by assigning a unique time factor to each signal establishing its relative time of sensing as part of radiation received in step 21.1;
   (1.5) identifying sequentially paired signals from step 1.4 by determining which signals have equal sequential separating time intervals based on differences between assigned time factors for the sequential signals and which fall within a general range of time intervals assigned to stobe-like anti-collision devices;
   (1.6) comparing separating time intervals between subsequent, sequential signals identified under repeated application of step 1.4 and identifying additional paired signals having the same separating time interval and matching the additional paired signals with the paired signals of step 1.5 having the same separating time interval to thereby create a sequential train of pulse signals representing a single separating time interval corresponding to a single periodic signaling device;
   (1.7) assigning each train of pulse signals an azimuth orientation factor with respect to the monitoring air craft;
   (1.8) identifying sequentially paired signals from among signals of step 1.7 which have (i) common orientation and (ii) the same respective separating time intervals which fall within a general range of time intervals assigned to strobe-lie anti-collision devices;
   (1.9) maintaining an ongoing list of unmatched pulses identified in accordance with step 1.4;
   (1.10) forming a new list of pulse pairs between each unmatched pulse of the previous step and each new pulse of common orientation, each pulse pair having a time interval corresponding to the time lapse between the identified time factors between the unmatched pulse and the new pulse;
   (1.11) aging all identified signals under the previous step and maintaining the most current pulse pairs of signals in an active status for a period up to 5 seconds while deleting out signals aged beyond 5 seconds;
   (1.12) comparing and matching with the current pulse pairs or the previous step each subsequent signal and associated separating time interval which does not form an extension of an ongoing train of pulse signals of common orientation, to thereby form a new train or pulses corresponding to a new signaling device; and
   (1.13) generating an alarm upon occurrence of the train of successive pulse signals by matching with subsequent signals of the same separating time interval and orientation to give notice of azimuth orientation of the nearby aircraft.

2. A detection device for enabling enhanced visual detection within a monitoring aircraft of nearby aircraft which have a strobe-like signaling device, said device comprising:
   (2.1) an array of external detectors attached to the monitoring aircraft for sensing radiation from the signaling device in combination with (i) background radiation and (ii) pulse-like radiation occurring in random manner and being comparable in amplitude and pulse width with radiation of the signaling device;
   (2.2) detector circuit means coupled to the detectors and being capable of repeatedly generating electromagnetic signals representing cumulative radiation of step
   (2.3) background filter means coupled to the detector circuit for filtering out that portion of the signals corresponding to background radiation, thereby enabling generation of signals which substantially represents only (i) the pulse-like radiation occurring in random manner and (ii) the pulsed radiation emitted from the strobe device;
   (2.4) rejection means coupled to the detector circuit means for detecting and rejecting that portion of signals generated in the previous step which represents pulsed radiation occurring in random manner;
   (2.5) processing means coupled to the detector circuit means for determining the occurrence of equal separating time intervals between the remaining signals representing the pulsed radiation generated by the signalling device of the nearby aircraft, and processing means having logic means to (i) confirm a strobe-like periodicity for successive signals having equal separating time intervals, and (ii) define an azimuth orientation for the successive signals with respect to the aircraft;

(2.6) display means coupled to the processing means for generating an alarm which provides notice of the nearby aircraft;

(2.7) said detector comprising a base member with at least one photo detector element attached thereto and oriented at an appropriate azimuth range to be monitored by the photo detector element; a tubular enclosure mounted at one end to the base member and forming a wall or blocking lateral radiation from exposure to the photo detector element, said tubular enclosure having an aperture at an opposing end for providing a window to the azimuth range to be monitored; and a lens collection device mounted within the tubular enclosure for gathering light from the monitored range and for directing such light to a photosensitive surface of the photo detector element;

(2.8) said device further comprising a plurality of detector elements positioned within the tubular member in an individually separated array, thereby generating a series of separated fields of view which are respectively spatially separated by non monitored sectors;

(2.9) wherein a plurality of detectors are positioned in contiguous array such that the non monitored sectors are included within the field of view of a contiguous detector.

3. A device as defined in claim 2, further comprising a honeycomb screen positioned across the aperture of the tubular enclosure for controlling scattered radiation from dust and other particulate matter at the face of the lens device and for assisting in proper control of incoming radiation.

* * * * *